United States Patent
Kumar et al.

(10) Patent No.: US 8,205,431 B2
(45) Date of Patent: Jun. 26, 2012

(54) BEARING-LIKE STRUCTURE TO CONTROL DEFLECTIONS OF A ROTATING COMPONENT

(75) Inventors: Keshava Kumar, South Windsor, CT (US); Joseph Ewing, Jupiter, FL (US); Steven Burd, Cheshire, CT (US)

(73) Assignee: United Technologies Corporation, Hartford, CT (US)

( * ) Notice: Subject to any disclaimer, the term of this patent is extended or adjusted under 35 U.S.C. 154(b) by 1061 days.

(21) Appl. No.: 12/093,498

(22) PCT Filed: Dec. 12, 2005

(86) PCT No.: PCT/US2005/044825
§ 371 (c)(1),
(2), (4) Date: May 13, 2008

(87) PCT Pub. No.: WO2007/084100
PCT Pub. Date: Jul. 26, 2007

(65) Prior Publication Data
US 2009/0010754 A1    Jan. 8, 2009

(51) Int. Cl.
*F02K 3/02* (2006.01)
(52) U.S. Cl. .................................................. 60/226.1
(58) Field of Classification Search ............ 60/226.1, 60/262; 415/173.1, 173.4
See application file for complete search history.

(56) References Cited

U.S. PATENT DOCUMENTS

| | | | |
|---|---|---|---|
| 3,269,120 A | 8/1966 | Sabatiuk | |
| 3,892,069 A | 7/1975 | Hansford | |
| 3,930,071 A * | 12/1975 | Rao et al. | 427/203 |
| 4,844,692 A * | 7/1989 | Minkkinen et al. | 415/208.1 |
| 4,969,326 A | 11/1990 | Blessing et al. | |
| 5,237,817 A | 8/1993 | Bornemisza et al. | |
| 5,785,492 A * | 7/1998 | Belsom et al. | 415/173.7 |
| 5,941,536 A * | 8/1999 | Hill | 277/634 |
| 5,984,629 A * | 11/1999 | Brodersen et al. | 415/172.1 |
| 6,059,523 A * | 5/2000 | Modafferi et al. | 415/9 |
| 6,068,443 A * | 5/2000 | Aoki et al. | 415/173.5 |
| 6,148,518 A * | 11/2000 | Weiner et al. | 29/889.2 |
| 6,454,527 B2 * | 9/2002 | Nishiyama et al. | 415/119 |

(Continued)

FOREIGN PATENT DOCUMENTS
DE    19727296    1/1999

OTHER PUBLICATIONS

Search Report PCT/US05/44825. Extended European Search Report dated Sep. 1, 2011 for EP Application No. 05853692.1.

*Primary Examiner* — Ehud Gartenberg
*Assistant Examiner* — Gerald Sung
(74) *Attorney, Agent, or Firm* — Carlson Gaskey & Olds P.C.

(57) ABSTRACT

A bearing like surface on a stationary component reduces deflection of an adjacent rotating component. The stationary component is generally parallel to and offset from a rotational component. The rotational component rotates about a central axis. Protrusions located on the stationary component are in contact with the rotational component to prevent deflection of the rotational component while reducing the friction between the rotational and stationary component. The protrusions have a generally flat surface that may be used to affix the protrusions to the stationary component. An arced surface of the protrusions is in contact with the rotating component. The number, size and the shape of the protrusions are determined by the requirements of the application.

30 Claims, 4 Drawing Sheets

U.S. PATENT DOCUMENTS

| | | | |
|---|---|---|---|
| 6,595,744 B2 * | 7/2003 | Van Houten | 415/173.1 |
| 7,234,918 B2 * | 6/2007 | Brillert et al. | 415/173.5 |
| 7,338,251 B2 * | 3/2008 | Ro et al. | 415/58.3 |
| 7,478,993 B2 * | 1/2009 | Hong et al. | 415/211.2 |
| 2005/0285345 A1 * | 12/2005 | Webster | 277/355 |
| 2006/0120860 A1 * | 6/2006 | Dong et al. | 415/173.1 |
| 2007/0224035 A1 * | 9/2007 | Nigmatulin | 415/170.1 |
| 2008/0118350 A1 * | 5/2008 | Feeny et al. | 415/173.1 |

* cited by examiner

BEARING-LIKE STRUCTURE TO CONTROL DEFLECTIONS OF A ROTATING COMPONENT

BACKGROUND OF THE INVENTION

The present invention is a bearing-like structure on a stationary component that reduces deflections on an adjacent rotating component. More particularly, protrusions located on the stationary component contact the rotational component to prevent deflection of the rotational component while reducing the friction between the rotational and stationary components.

Rotating components are utilized in many devices, such as fan blades in a turbine engine. Deflections may occur at the outer portions of the component as the component rotates about an axis. At higher speeds and after long periods, greater amounts of deflection can occur. There are several ways to prevent the rotating component from deflecting. For example, the rotating component can be made thicker or stronger to withstand the forces causing deflection. However, this solution adds weight, may increase size of the component, and is not feasible in all applications.

An alternate method of controlling deflections is placing a stationary component adjacent to the rotating component to provide support for the outer portions of the rotating component to prevent deflection. As the rotating component rotates about the axis, friction builds between the rotating component and the stationary component at points of contact. The friction increases as the speed of the rotational component increases. Heat is also a result of the friction between the rotational component and the stationary component.

Thus, an arrangement that provides support to a rotating component while reducing friction between the rotating component and a stationary component is needed.

SUMMARY OF THE INVENTION

The present invention provides a bearing-like surface on a stationary component to reduce deflections on an adjacent rotating component. The arrangement is preferably used in a turbine engine between a fan blade and housing.

The stationary component extends generally parallel to, and offset from, a rotational component. The rotational component rotates about a central axis. In order to prevent deflection, protrusions located on the stationary component are in contact with the rotational component. The protrusions reduce an amount of surface area in contact between the rotational component and the stationary component, lowering the amount of friction created. Additionally, the protrusions may be coated in, or formed from, a material to providing a lower friction surface for contact. The protrusions may be affixed to the stationary component or formed as one-piece with the stationary component.

For example, in a tip turbine engine, the fan blades are in contact with a stationary component that is part of the engine housing or case. The stationary component supports the outer ends of the fan blades to limit deflection of the fan blades during rotation. In the preferred embodiment, the stationary component is affixed to the turbine exhaust case housing and the fan blades rotate about the centerline of the turbine engine. Protrusions are located on the stationary component to reduce the friction between the stationary component and the fan blades.

In alternate embodiments for a tip turbine engine, the stationary component could be the fan exhaust case housing, the fan inlet housing or the housing for the combustor assembly.

In other gas turbine engines, the rotating module can be a fan, compressor or turbine rotor segment in contact with an adjacent or accommodating stationary components, or combustor and diffuser case or housings.

The protrusions have a generally flat surface in contact with the stationary component. The flat surface may be used to affix the protrusions to the stationary component. An arced surface of the protrusions is in contact with the rotating component. The number, size and the shape of the protrusions are determined by the requirements of the application.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
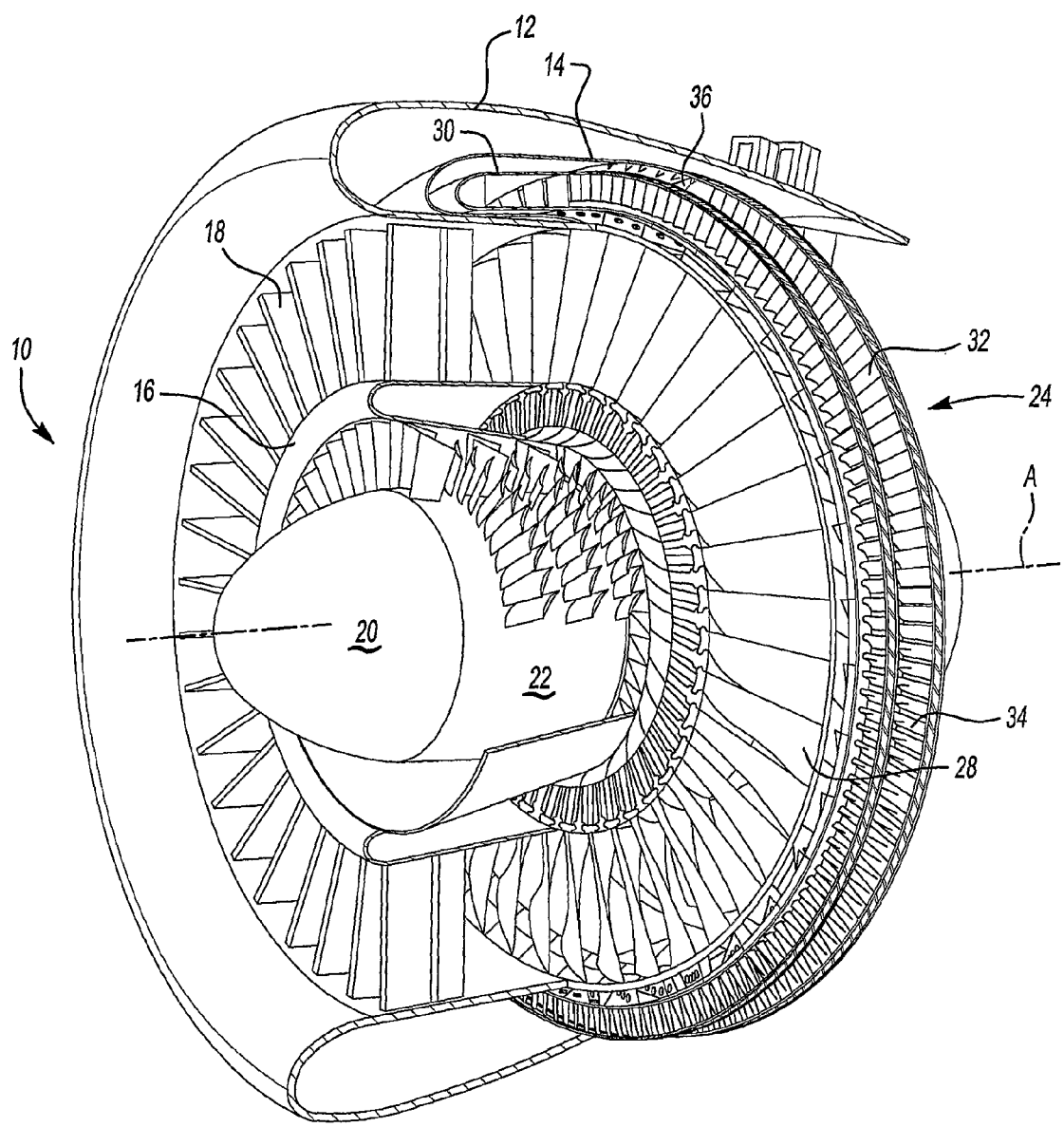
FIG. 1 is a general view a tip turbine engine.

FIG. 1 illustrates a general perspective partial sectional view of a tip turbine engine type gas turbine engine 10. The engine 10 includes an outer nacelle 12, a rotationally fixed static outer support structure 14 and a rotationally fixed static inner support structure 16. A multitude of fan inlet guide vanes 18 are mounted between the static outer support structure 14 and the static inner support structure 16. A nose cone 20 is preferably located along the engine centerline A to smoothly direct airflow into an axial compressor 22 adjacent thereto. The axial compressor 22 is mounted about the engine centerline A behind the nose cone 20.

A fan-turbine rotor assembly 24 is mounted for rotation about the engine centerline A aft of the axial compressor 22. The fan-turbine rotor assembly 24 includes a multitude of hollow fan blades 28 to provide internal, centrifugal compression of compressed airflow from the axial compressor 22 for distribution to an annular combustor 30 located within the rotationally fixed static outer support structure 14.

A turbine 32 includes a multitude of tip turbine blades 34 which rotatably drive the hollow fan blades 28 relative to a multitude of tip turbine stators 36 which extend radially inwardly from the static outer support structure 14. The annular combustor 30 is axially forward of the turbine 32 and communicates with the turbine 32.

Figure 2:
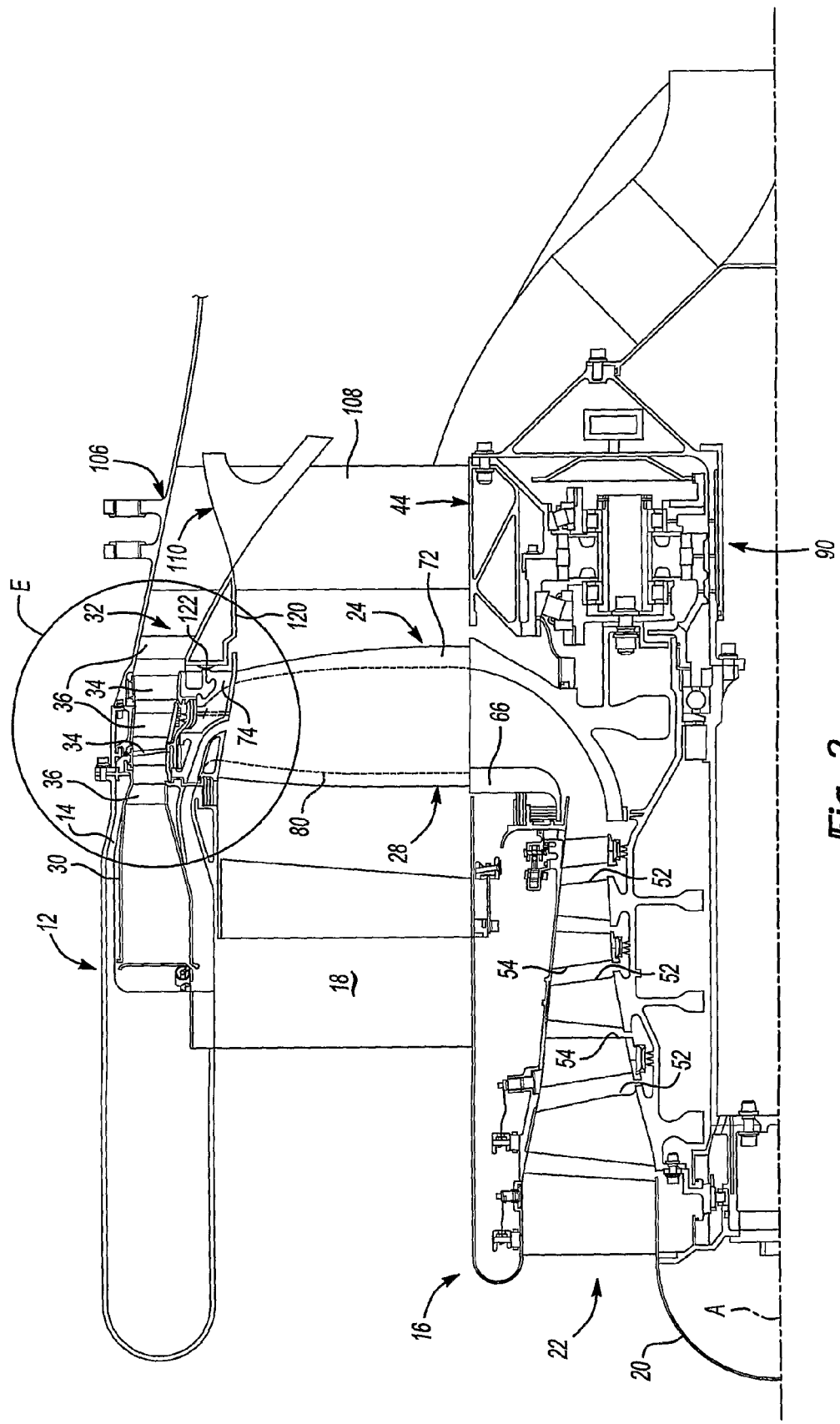
FIG. 2 is an internal view of the tip turbine engine.

Referring to FIG. 2, in operation, air enters the axial compressor 22, where it is compressed by compressor blades 52 and compressor vanes 54. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is turned and diffused toward an axial airflow direction toward the annular combustor 30. The airflow is further compressed centrifugally in the hollow fan blades 28 by rotation of the hollow fan blades 28. From the core airflow passage 80, the airflow is turned and diffused axially forward in the engine 10 into the annular combustor 30. The compressed core airflow from the hollow fan blades 28 is mixed with fuel in the annular combustor 30 and ignited to form a high-energy gas stream. The high-energy gas stream is expanded over the multitude of tip turbine blades 34 mounted about the outer periphery of the fan-turbine rotor assembly 24 to drive the fan-turbine rotor assembly 24, which in turn drives the axial compressor 22 through the gearbox assembly 90. Concurrent therewith, the fan-turbine rotor assembly 24 discharges fan bypass air axially aft to merge with the core airflow from the turbine 32 in an exhaust case 106. A multitude of exit guide vanes 108 are located between the static outer support housing 44 and the rotationally fixed static outer support structure 14 to guide the combined airflow out of the engine 10 to provide forward thrust. An exhaust mixer 110 mixes the airflow from the turbine blades 34 with the bypass airflow through the fan blades 28.

Figure 3:
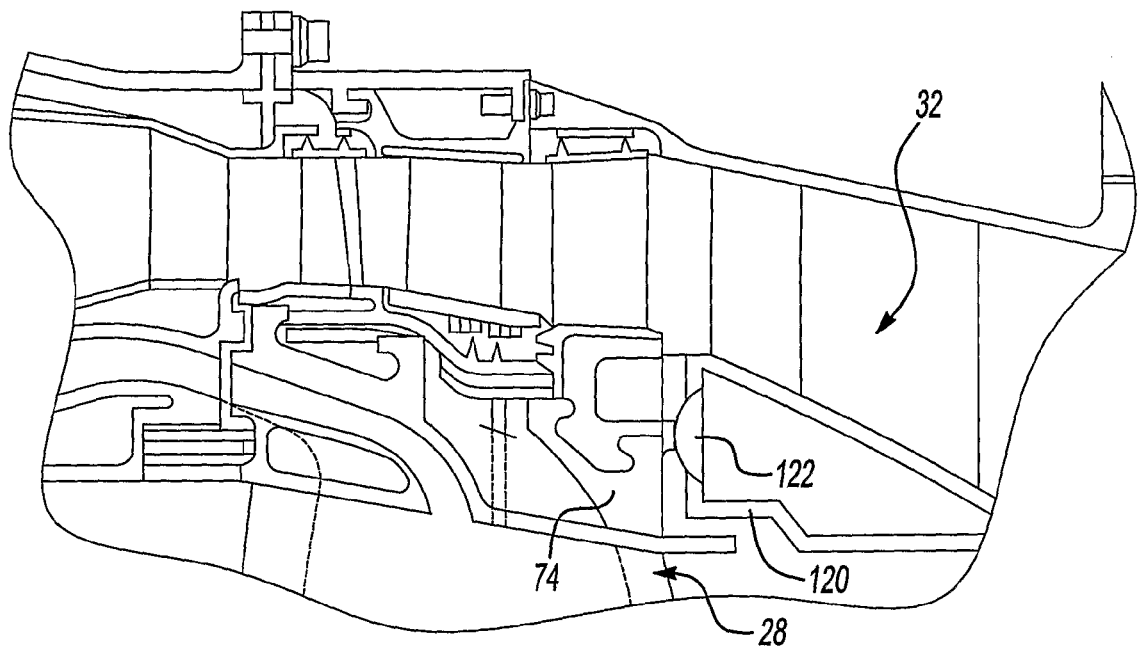
FIG. 3 is an enlarged view of a portion of a tip turbine engine from area E of FIG. 2.

FIG. 3 illustrates an enlarged portion of the fan blades 28 and the turbine 32. The diffuser section 74 of the fan blades 28 is in contact with a stationary component 120 that is part of the turbine 32 housing. The stationary component 120 sustains the outer ends of the fan blades 28 at the diffuser section 74 to limit deflection of the fan blades 28 during rotation. The stationary component 120 is affixed to the turbine 32 housing and the fan blades 28 rotate about the centerline A (shown in FIG. 1) of the turbine engine 10. In order to prevent deflection the stationary component 120 is in contact with the diffuser section 74 of the fan blades 28 over the complete rotation of the fan blades 28. As the fan blades 28 rotate friction occurs between the stationary component 120 and the diffuser section of the fan blades 28. Protrusions 122 are located on the stationary component 120 to reduce the contact area between the stationary component 120 and the fan blades 28. The protrusions 122 are in contact with the fan blades 28. However, due to the protrusions 122, the fan blades 28 do not contact the larger surface 124 of the stationary component 120 during rotation. The reduction in surface area of the contact between the fan blades 28 and the stationary component 120 lowers the amount of friction created. Additionally, the protrusions 122 may be coated in, or formed from, a material to provide a lower friction surface for contact. Although the protrusions are shown are affixed to the stationary component 120 the protrusions 122 may also be formed as one-piece with the stationary component 120.

Figure 4:
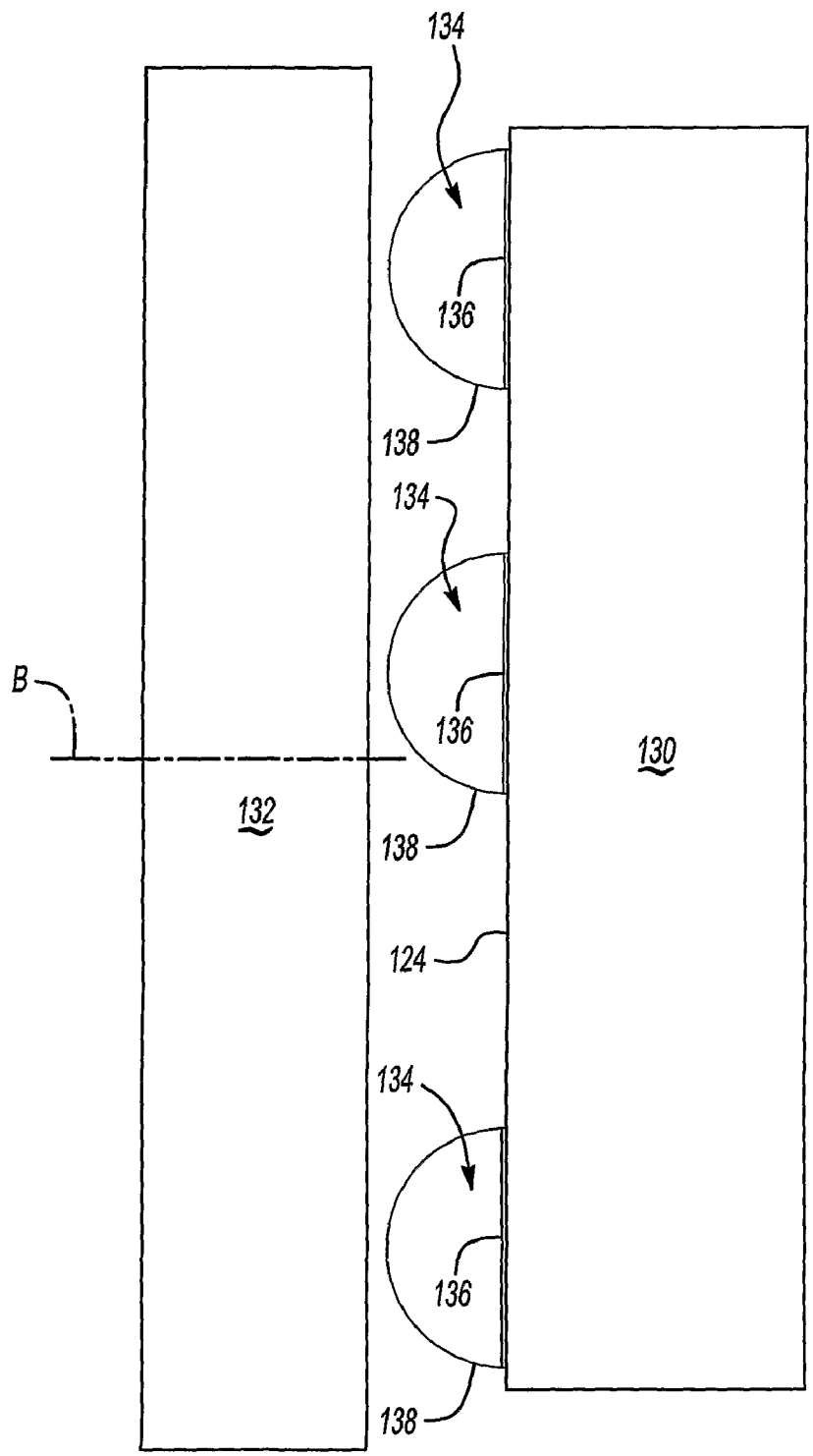
FIG. 4 is a side view of one embodiment of the present invention.

Although the above embodiment discloses one example of a turbine engine any device having a rotating component and a stationary component may be benefit from the present invention. Referring to FIG. 4 a stationary component 130 is generally parallel to and offset from a rotational component 132. The rotational component 132 rotates about a central axis B. Protrusions 134 located on the stationary component 130 may be in contact with the rotating component 132 or slightly spaced, as shown. It is not required that the rotating component 132 be in contact with the protrusions 134 at all times. For example, contact between the protrusions 134 and the rotating component 132 might occur when the rotating component 132 begins to deflect. As an example, when the rotating components 132 begin to deflect at higher speeds, it may take up a prior clearance and contact protrusions 134. The protrusions 134 would then contact with the rotating component 132 to limit any further amount of deflection. Once the deflections returns to normal the rotating component 132 would no longer be contacting the protrusions 134.

In the embodiment shown there are four protrusions 132 located on the stationary component 130. The protrusions 134 have a generally flat surface 136 in contact with the stationary component 130. The flat surface 136 may be used to affix the protrusions 134 to the stationary component 130. An arcuate surface 138 of the protrusions 134 will contact with the rotating component 132, as shown. The number, size of the protrusions 134, including the height, and the shape of the protrusions 134 are determined by the requirements of the application. One skilled in the art would know the proper number, size and shape of the protrusions.

Figure 5:
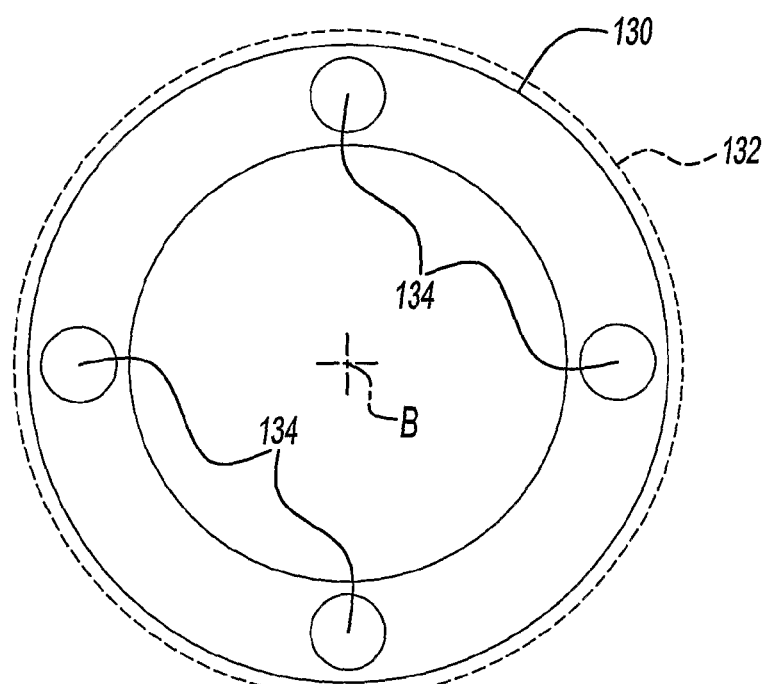
FIG. 5 is a schematic showing the locations of protrusions along a stationary component in one embodiment of the present invention.

FIG. 5 illustrates the embodiment having four protrusions. The protrusions 134 are spaced concentric about the center axis B of the rotating component 132. The protrusions 134 are evenly spaced from one another to maintain symmetric loading on the rotating component 132 when it is in contact with the protrusions 134.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine engine comprising: a fan having a rotating component that axially deflects; and a stationary component having a portion facing and adjacent to said rotating component wherein at least two protrusions extend from said portion toward said rotating component to limit axial deflection of said fan.

2. The turbine engine of claim 1, wherein said at least one protrusion is a plurality of protrusions.

3. The turbine engine of claim 2, wherein said plurality of protrusions are spaced concentric about a center of said rotating component.

4. The turbine engine of claim 2, wherein said plurality of protrusions are evenly spaced from one another.

5. The turbine engine of claim 1, wherein said at least one protrusion is in contact with said rotating component.

6. The turbine engine of claim 5, wherein said at least one protrusion has an arced surface contacting said rotating component and a generally flat surface contacting said stationary component.

7. The turbine engine of claim 1, wherein said rotating component is a fan blade and said stationary component is a fan housing.

8. The turbine engine of claim 1, wherein said at least one protrusion and said stationary component are formed as one-piece.

9. The turbine engine of claim 1, wherein said at least one protrusion is coated to provide a lower friction surface.

10. The turbine engine of claim 1, wherein said at least one protrusion is initially spaced from said rotating component.

11. A turbine engine comprising: a fan having at least one fan blade rotating about a central axis; a stationary component having a portion facing and adjacent to said at least one fan blade; and a plurality of protrusions extending from said stationary component toward said at least one fan blade to limit axial deflection of said fan, wherein said plurality of protrusions are spaced concentrically about said central axis.

12. The turbine engine of claim 11, wherein said plurality of protrusions are each in contact with said at least one fan blade.

13. The turbine engine of claim 12, wherein said plurality of protrusions have an arced surface contacting said at least one fan blade and a generally flat surface contacting said stationary component.

14. The turbine engine of claim 11, wherein said plurality of protrusions and said stationary component are formed as one-piece.

15. The turbine engine of claim 11, wherein each of said plurality of protrusions are coated to provide a lower friction surface.

16. The turbine engine of claim 11, wherein said plurality of protrusions are initially spaced from said rotating component.

17. A device comprising: a rotating compressor component defining a central axis about which said component rotates; a stationary component having a portion facing and adjacent to said rotating component; and a plurality of protrusions extending from said stationary component portion and said rotating compressor component and towards the other to limit axial deflection of said rotating compressor component, wherein said plurality of protrusions are spaced concentric about said central axis.

18. The device of claim 17, wherein said plurality of protrusions are forward on said stationary component.

19. The device of claim 17, wherein said plurality of protrusions do not contact the other of said stationary component and said rotating component, wherein said rotating component rotates at low speeds.

20. The device of claim 17, wherein said at least one protrusion has an arced surface.

21. The turbine engine of claim 1, wherein the rotating component is a fan blade.

22. The turbine engine of claim 1, wherein the protrusion extends axially forward from the portion.

23. The turbine engine of claim 1, further comprising an axial compressor axially forward of the fan blade.

24. The turbine engine of claim 1, wherein the fan blade is a hollow fan blade having an inducer section, a hollow fan blade section, and a diffuser section, wherein the rotating component is disposed in the diffuser section.

25. The turbine engine of claim 24, wherein the airflow from the axial compressor is turned radially outwards in the inducer section, wherein airflow is turned axially forward in the diffuser section.

26. The turbine engine of claim 24, wherein a combustor section and turbine section are radially outward of the fan blade.

27. The turbine engine of claim 1, wherein the rotating component has an axially rearward face adjacent and opposing an axially forward face of the at least one protrusion.

28. The turbine engine of claim 1, wherein the plurality of protrusions is arranged to contact an axial face of the rotating component.

29. The turbine engine of claim 11, wherein the plurality of protrusions extend from said portion toward said rotating component to limit axial deflection of said fan.

30. The device of claim 17, wherein the plurality of protrusions extend from said portion toward said rotating component to limit axial deflection of said fan.

\* \* \* \* \*